United States Patent [19]

Kenney

[11] 4,029,434

[45] June 14, 1977

[54] VARIABLE PITCH MOUNTING FOR AIRFOIL BLADES OF A WINDMILL OR PROPELLER

[76] Inventor: Clarence E. Kenney, 119 Stuart Road, Racine, Wis. 53406

[22] Filed: May 22, 1975

[21] Appl. No.: 579,822

[52] U.S. Cl. .................. 416/41; 416/136; 416/139; 416/202; 416/225

[51] Int. Cl.² ........................ F03D 7/04

[58] Field of Search .......... 416/135, 139, 202, 225, 416/41, 51, 136–138, 140

[56] References Cited

UNITED STATES PATENTS

| | | | |
|---|---|---|---|
| 1,407,271 | 2/1922 | Harkins | 416/168 X |
| 1,943,210 | 1/1934 | De Lavaud | 416/139 X |
| 2,023,684 | 12/1935 | Hubbell | 416/51 |
| 2,043,136 | 6/1936 | Weible | 416/145 X |
| 2,047,776 | 7/1936 | Hafner | 416/135 |
| 2,054,383 | 9/1936 | Ludewig | 416/135 |
| 2,074,871 | 3/1937 | Symons | 416/136 X |
| 2,253,013 | 8/1941 | Birch | 416/202 X |
| 2,483,913 | 10/1949 | Lampton | 416/136 |
| 2,557,220 | 6/1951 | Gazda | 416/157 X |
| 2,660,252 | 11/1953 | Doussain et al. | 416/225 X |
| 3,637,321 | 1/1972 | Nekrasov et al. | 416/136 |

FOREIGN PATENTS OR APPLICATIONS

| | | | |
|---|---|---|---|
| 814,570 | 6/1937 | France | 416/136 |
| 614,716 | 12/1926 | France | 416/135 |
| 855,023 | 4/1940 | France | 416/135 |
| 983,048 | 6/1951 | France | 416/155 |
| 1,503,480 | 7/1970 | Germany | 416/136 |
| 509,675 | 10/1930 | Germany | 416/139 |
| 411,183 | 6/1934 | United Kingdom | 416/136 |
| 449,664 | 7/1936 | United Kingdom | 416/136 |
| 487,937 | 6/1938 | United Kingdom | 416/135 |

*Primary Examiner*—Everette A. Powell, Jr.
*Attorney, Agent, or Firm*—Arthur J. Hansmann

[57] ABSTRACT

A blade mounting having journal and thrust bearings locating the blades in a hub to relieve load and therefore friction by a torsionally flexible tension member secured within each blade so that centrifugal forces of the blade are transmitted directly to the hub, instead of thru the thrust bearing. Also, each blade is located in the hub so that the aerodynamic torque and thrust on the blade are transmitted directly to the hub as components of the centrifugal force.

6 Claims, 6 Drawing Figures

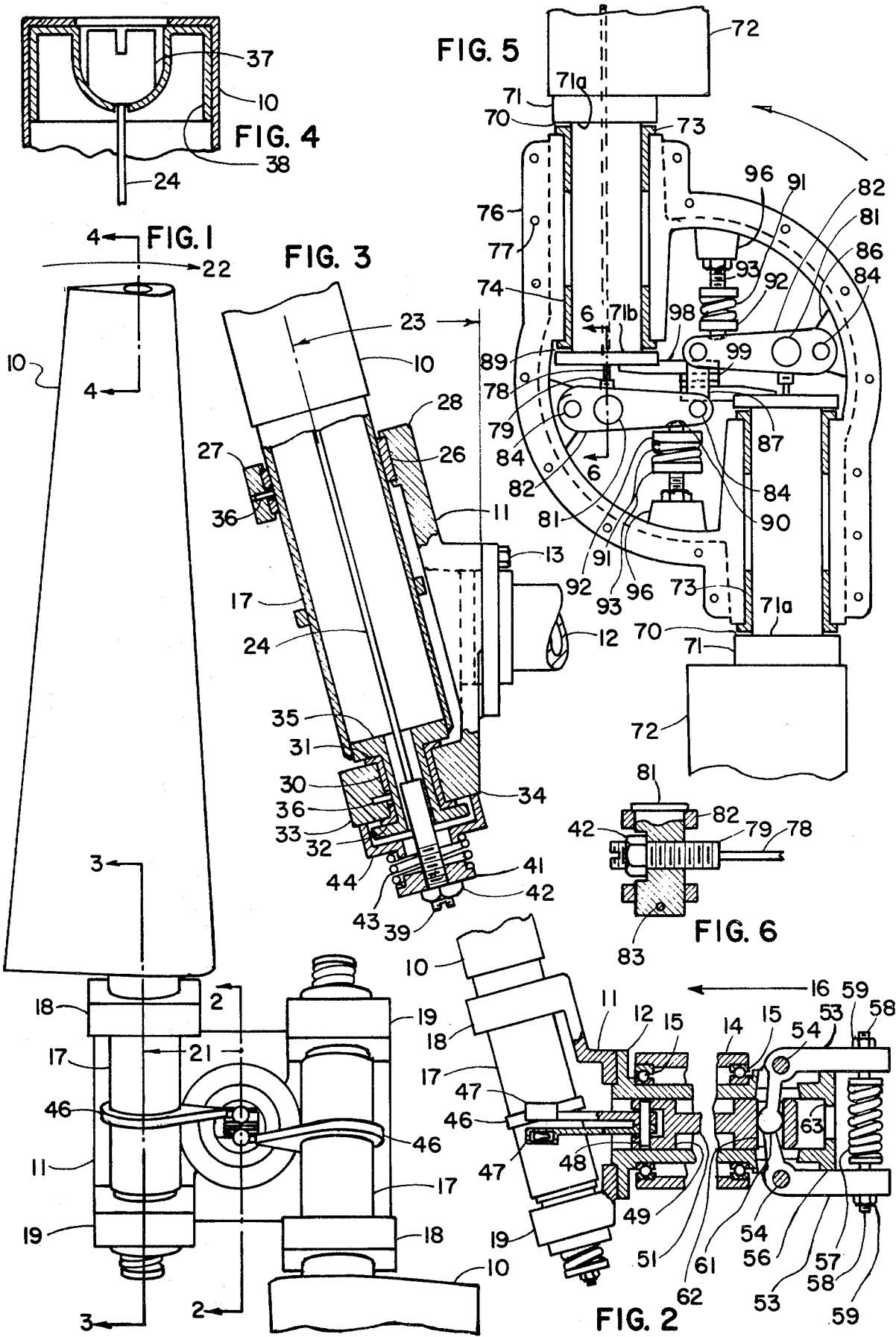

VARIABLE PITCH MOUNTING FOR AIRFOIL BLADES OF A WINDMILL OR PROPELLER

This invention relates to a variable pitch mounting for airfoil blades of a windmill or propeller, and, more particularly, it relates to the blade mounting having journal and thrust bearings which are relieved of load by a torsionally flexible member connected to each blade.

BACKGROUND OF THE INVENTION

The variable pitch blades of existing windmills and aeroplane propellers are carried in their hubs by ball or roller bearings so that they can be rotated or "feathered" by acceptable levels of torque applied either by manual or automatic means as required by considerations of application and design. These anti-friction bearings wear and pit, especially when subject to vibration while in one position for considerable periods of time. In present practice, the bearings of aeroplane propellers are inspected at regular intervals and replaced when worn. This maintainance is tolerated in an aeroplane, but would not be accepted in a windmill owned and maintained by average homeowners.

This invention discloses a torsionally flexible member which is strong and rigid in tension, within each blade. The outer end is fastened securely to the blade and the inner end is fastened to the hub to transmit the centrifugal force of the blade directly to the hub instead of thru the bearings providing nominal location of the blade, in the hub. In addition, the geometrical location of the blades in the hub is designed so the either output torque from a windmill, or torque to the blades of a propeller and aerodynamic thrust on the blades is transmitted directly to the hub as components of centrifugal force by the tension member within each blade.

When forces between the hub and each blade are thus transmitted wholly or in major part by a tension member instead of by the bearings locating the blades, sleeve bearings can be used with torque required to feather the blades within the output of a direct acting centrifugal govenor, or manual control. Sleeve bearings will provide long service without maintainance.

The tension member permitting use of sleeve bearings will also provide a valuable measure of safety. It will retain a blade accidentally separated from its root or hub, limiting damage to the immediate structure. This assurance of protection to persons and property near a windmill will increase public acceptance of the windmill as a means of putting the wind component of solar energy to work.

The tension member will be maintained ready to perform its safety function by constant use in feathering at excessive wind velocities. Any failure will be revealed by external inspection of the blade end or by malfunction of the overspeed governor. These factors insure that the tension member will be available when and if needed and it will be a reliable defense against damage to persons or property resulting from any unpredictable failure of the blade.

Transmission of torque is obtained by locating the centerline of blade force removed from the rotational centerline of the windmill or propellor so that torque from a windmill or to a propellor is transmitted as the product of the displacement radius and centrifugal force. By a similar geometry of mounting, each blade is located downwind at at "coned" angle to a shaft perpendicular, so that the aerodynamic thrust of the blade is also transmitted to the hub as a component of the centrifugal force of the blade.

When a tension member is provided to thus transmit all forces of a blade directly to the hub, sleeve journal bearings and thrust washers can be used to provide nominal location of the blade instead of the ball or roller bearings generally used when blade pitch is to be varied, while maintaining the low torque requirements necessary for adjustment of blade pitch. Sleeve bearings will furnish long life free of maintainance, in contrast to the periodic inspection and replacement of antifriction bearings which is tolerated in the propellers of aircraft, but which would be intolerable in a windmill owned and mintained by average-typical homeowners.

The same tension member provided to relieve the sleeve bearings of load, will be ready at any time to retain a blade which would otherwise be thrown from the windmill by accidental failure of attachment to the root or hub. Damage will be confined to the structure of the windmill to allay fear and increase public acceptance of windmills.

BRIEF DESCRIPTION OF THE DRAWINGS

FIG. 1 is a vertical elevation facing the disc of a windmill showing one blade and a fragment of another.

FIG. 2 is a section on line 2—2 of FIG. 1.

FIG. 3 is an enlarged section taken on line 3—3 of FIG. 1 showing details of bearings locating the blade root and the fastening of the tension member to the hub.

FIG. 4 is an enlarged section taken on line 4—4 of FIG. 1 showing the tension member fastened in the tip of the blade.

FIG. 5 is a section thru the hub of an aeroplane propeller showing a lever system whereby the force of one tension member is opposed by that of the other at all operating sppeds.

FIG. 6 is an enlarged section taken on line 6—6 of FIG. 5 showing the attachment of the tension member to the lever.

DETAILED DESCRIPTION OF THE PREFERRED EMBODIMENT

FIG. 1 is a view facing the disc of a windmill with two variable pitch blades 10, mounted in a common hub, 11, the hub being fastened to a horizontal shaft 12 by bolts 13 as shown in FIGS. 2 and 3. The shaft 12 is rotably supported in a housing 14 by bearings 15. A section of the housing 14 which is broken away and not shown, is rotably supported, in any conventional manner, on a vertical journal, part of a supporting tower and is rotated by conventional means such as a vane so that wind approaches the blades in the direction shown by arrow 16. The shaft 12 extends thru conventional means not shown but usually belts or gears increasing rotational speed, to drive a load, as an electric power generator.

Each blade 10 is securely fastened to a blade root 17 which is rotably located in the hub 11, by a journal bearing assembly 18 and a combined journal and thrust bearing assembly 19. The rotational axis of each blade is displaced from the axis of the shaft 12 by a radius 21 so that when the windmill is rotated by the wind in the direction of arrow 22, the torque developed will be transmitted to the shaft 12 as a component of the centrifugal force on the blade instead of as a couple by the journals of bearing assemblies 18 and 19, as is the case (inusual construction), when the radius 21 is zero.

An equivalent geometry of blade location is shown in FIG. 3 where the rotational or "feathering" axis of the blade 10 is shown located at an angle 23 to the shaft perpendicular. Aerodynamic thrust in the direction of arrow 16, is transmitted to the hub 11 as a component of centrifugal force as was the torque. Thus, all major forces of the blade 10 can be transmitted to the hub 11 by the thrust bearing of assembly 19.

The enlarged sections, FIGS. 3 and 4 show the inner and outer fastenings of a tension member 24, provided according to this invention, to transmit the combined forces of the blade 10 and root 17, directly to the hub 11, instead of thru the thrust bearing of assembly 19.

Referring to FIG. 3, the bearing assembly 18, includes a sleeve of low-friction plastic material 26 retained by a cover 27 and base 28. The assembly 19 includes a split bearing sleeve 30 with integral thrust faces 31 and 32 of similar material, retained in a cover 33 and base 34. An extension 35, part of the root 17, provides journal and thrust surfaces for the bearing 30. The bearings 26 and 30 are located and prevented from rotating by pins 36, fitted tightly in the covers 27 and 33 and loosely in the bearings. The bases 28 and 34, are part of the hub 11. The covers 27 and 33 are fastened to them by bolts countersunk into the hub 11 and not shown.

The outer end of tension member 24 is shown in FIG. 4, suitably secured in a fitting 37 which bears in a reinforcement 38, part of the blade 10, and is capable of transmitting the maximum centrifugal force of the blade 10 to the tension member 24. The inner end of the tension member 24 is connected to and is terminated in a threaded fitting 39 passing thru a tapped hole in the spring seat 41 and is locked by a nut 42. A compression spring 43 and spring seat 44, transmit the force of the tension member 24 directly to the hub 11 thru the bearing base 34.

The compression of spring 43 is adjusted by calculation and test to equal the combined forces of the blade assembly midway in the range of overspeed within which the blades are to be feathered. The blades of a windmill desgined to recover maximum energy from winds of all velocities within a safe operating range will be maintained in a fixed position at all speeds within the safe operating range and will rotate at speeds proportional to wind velocity. Thus it is practical to unload the thrust bearing permitting feathering of the blades only at sppeds above the operating range. This feathering of the blades is necessary to safe and unattended operation of a windmill. It is usually provided by a centrifugal governor with weights held against a low speed stop at all operating speeds and designed to move thru full stroke in a relatively narrow range of overspeed.

FIGS. 1 and 2 show a representative mechanism capable of feathering the blades of a windmill, thereby limiting overspeed to a safe maximum. Levers 46, part of the blade roots 17, have spherical ends carried in the mating ends of links 47. Both links 47 pivot on a pin 48 carried in a common crosshead 49 which can move axially in a bore shown in the shaft 12. The levers 46 feather the blades 10 to equal angles of pitch as the crosshead 49 moves in the shaft 12. An extension 51 of the crosshead 49 connects to a manual control (not shown) or to a centrifugal governor shown to have two governor weights 53 pivot on pins 54, carried on projections of the shaft 12, and held against stops 56, also part of the shaft 12 by a spring 57. The end fittings 58 of spring 57, pass thru clearance holes in the weights 53 and are locked by nuts 59. Lever arms 61, part of the weights 53, are displaced to either side of the shaft center and slide snugly in a slot 62, part of the crosshead extension 51. The set tension of spring 57 is adjusted by design and test to equal the centrifugal force of the weights 53 at the maximum operating speed of the windmill. Through the range of overspeed, the weights 53 will move out, lever arms 61 will move the extension 51 and crosshead 49 to feather the blades 10 to a pitch increase sufficient to limit rotational speed of the windmill to a safe maximum in the maximum wind velocity anticipated where the windmill is installed. At this maximum blade angle, the crosshead extension 51 will be just clear of a stop 63, part of the shaft 12.

It is entirely practical for a direct acting governor as described to feather the blades of a windmill when the bearings are of long-lived sleeve design, if a tension member is provided within each blade to transmit the forces of the blade directly to the hub instead of thru the bearings. The governor shown also employs long-lived sleeve bearings which can be lightly loaded by location of the spring 57 near the center of centrifugal force on the weight 53. Some stick-slip movement of the governor in control of blade pitch will remain which could not be tolerated in a system designed to control the operating speed of a synchornous generator being connected to a power output line. However a small percent of stick-slip is desirable in control of overspeed. It will prevent constant movement of the governor and blades in response to small changes in wind velocity. Both the displacement radius 21 and the cone angle 23 are shown greater than required in a working design to better illustrate the principles employed.

A section thru an aeroplane propeller is shown in FIG. 5 to demonstrate use of a tension member within each blade when torque is to, instead of from, the blade and to describe a system of inter-connecting the inner ends of the tension members whereby the thrust bearings nominally locating the blades can be without load over a range of operating speeds. Either means of unloading the thrust bearings can apply to the windmill or the propeller, depending on requirements of the given application.

The blade root 71, having shoulders 71a and 71b, of each blade 72 shown in FIG. 5 is located by flanged sleeve bearings 73 and 74 in a common hub, of which only the rear half 76 is shown. Bolt holes 77 receive bolts fastening a front half to the hub rear half 76. A tension member 78 extends from an outer fitting of each blade 72, similar to that shown in FIG. 4, to terminate in a threaded fitting 79 shown also in FIG. 6. The fittings 79 are locked in tapped holes in pins 81 by nuts 42. The pins 81 are retained in levers 82 by the riveted ends of a cross pin 83. The levers 82 pivot on pins 84 carried on bosses 86 of the half hub 76. Other pins 84 connect the levers 82 to a common link 87 to transmit the load of one tension member 78 to the other.

The loading of tension members 78 is adjusted by design and test so that at a designed minimum operating speed, the outer thrust fact 71a of each blade root 71, is just clear of the thrust face of bearings 73, as shown at 70. The total axial bearing clearance and the elastic strength of the tension members 78 are designed so that the inner thrust faces 71b of blade roots 71, just contact the thrust faces of bearings 74 at the maximum operating speed of the propeller, as shown at 89. This total axial clearance is small, in the order of 0.02 inches to 0.03 inches.

Two springs 91 hold spring seats 92 against sockets 90 in the levers 82 with force determined by adjustment of threaded spring seats 93 in bosses 96 of the hub half 76, to maintain equal clearances between thrust faces of the blade roots 71 and the bearings 73 and 74, at all speeds within the operating range of the propeller. These balancing springs are stiff enough to prevent oscillation of the blades and permit balancing the propeller assembly.

Levers 98, part of the blade roots 71, connect by links 99 to a common conventional means of blade pitch control.

It will be apparent to those skilled in the design of either windmills or propellers, that the tension members within the blades either can be anchored to both the tip and hub by the means shown or by other equivalent means within the intent of this invention. The tension member can be of any suitable design from stranded cable to a solid rod. An important consideration is its ability to bend without breaking, to safely retain a blade accidentally separated from the root or hub.

What is claimed is:

1. An airfoil blade mounting comprising a hub rotatable about an axis, two co-axially disposed and spaced-apart sleeve bearings supported on said hub and having a common axis disposed offset from the axis of rotation of said hub and at an angle to the plane of rotation of said hub, an airfoil blade having two cylindrical portions at one end thereof and with said portions being respectively rotatably disposed in said sleeve bearings for rotation of said blade about its longitudinal axis for changing the pitch of said blade, said blade extending from said hub to the other end of said blade and with said blade being hollow along its length and terminating in a terminal end portion disposed away from said hub, said one end of said blade having two spaced-apart and mutually facing thrust surfaces disposed transverse to the longitudinal axis of said blade and in respective abutting relationship with said hub and in restrictive movement relative to said hub and along said longitudinal axis, a tension member extending through the hollow of said blade and having one end thereof connected with said terminal end portion of said blade and with the other end of said tension member being anchored with said hub for supporting said blade against centrifugal force acting on said blade in the rotation of said blade and said hub about the axis of said hub and permitting the changes in pitch of said blade, and a spring operatively interconnected between said tension member and said hub and arranged to create a tensile force in said tension member to yieldingly restrain said blade against the influence of centrifugal force and thereby for yieldingly urging the radially inner one of said blade thrust surfaces away from abutting relationship with said hub, for rendering said blade free to rotate about its longitudinal axis in the changes in pitch of said blade.

2. The airfoil blade mounting as claimed in claim 1, including blade pitch means operatively associated with said hub and said blade for inducing selective pitch in said blade, and with said tension member being capable of twisting for accommodating the pitch adjustment of said blade.

3. The airfoil blade mounting as claimed in claim 2, wherein said blade pitch means includes an automatically operative governor element mounted on said hub and responsive to the speed or rotation of said hub and being capable of changing the pitch of said blade in response to changes in speed of rotation and within a selected speed range within which aerodynamic forces developed by said blade are transmitted to said hub mainly by said tension member rather than by forces on said bearing supporting said blade.

4. The airfoil blade mounting as claimed in claim 1, wherein said blade thrust surfaces are at disposed adjacent respective opposite ends of one of said bearings, and said thrust surfaces being slightly spaced from said bearing and arranged to allow longitudinal movement of said blade along the rotation axis of said bearings.

5. The airfoil blade mounting as claimed in claim 1, wherein there is a multiple of at least two of said blades and said bearings and said tension members, and with said blades being mounted in a pair arranged in opposed axial positions on said hub to have the longitudinal axis of each of said blades offset an equal distance from the rotation axis of said hub and with said blades thereby being disposed at an angle relative to the plane of rotation of said hub such that the thrust of said blades relative to said hub and which results from the aerodynamic forces on said blades is a component of the centrifugal force on said blades and is transmitted to said hub by said tension members.

6. The airfoil blade mounting as claimed in claim 5, wherein said bearings are symmetrically supported on said hub, and a lever system in said hub and said tension members being anchored with said lever system and capable of transmitting the forces to each other of said tension members and through said lever system, and springs operative between said hub and said lever system to hold said blades at equal radial positions within a predetermined axial float provided by said bearings locating each said blade.

* * * * *